Patented July 24, 1951

2,561,812

UNITED STATES PATENT OFFICE 2,561,812

RECOVERY OF SOLUBLE SUBSTANCES FROM FILTER-PRESS CAKES

Samuel A. Morell, Whitefish Bay, and John Shovers, Shorewood, Wis., assignors to Pabst Brewing Company, Milwaukee, Wis., a corporation of Delaware No Drawing. Application July 11, 1950, Serial No. 173,237

7 Claims. (Cl. 127—55)

This invention relates to a new process for the recovery of soluble substances from filter press cakes.

In many industrial filtrations, filter aids of various types such as diatomaceous earths, cellulosic and other organic fibers, and the like, are frequently employed for the clarification of either process liquors or finished liquid products. At the end of a filtration, relatively large amounts of valuable liquors may be retained in the resulting filter press cakes, or, when no filter aid is used, in the solid residues which are removed. The economy of a particular filtration operation is often dependent upon the efficiency with which these soluble liquors can be recovered from the cakes in which they are entrained.

There are two general recovery procedures which are practiced in the art: (1) thorough repulping of the press cake with fresh solvent liquor and refiltration, such repulping operation often being repeated until the cost of further repulping, refiltration, and concentration of the diluted liquor exceeds the value of the soluble material being recovered, and (2) washing the press cake, without removing it from the press, with fresh solvent liquor, the latter operation being generally known in the art as "sparging."

It is with the latter method of recovery that this invention is particularly concerned, a new process for more efficiently sparging filter press cakes having been discovered.

It is well known that a porous press cake, i. e., one which results from a relatively low pressure filtration, is more efficiently sparged than when the cake has been compressed. In many cases, however, as the filtration proceeds, it becomes necessary to permit the pressure to increase in order to maintain suitable filtration rates, with the result that at the end of filtration one is confronted with a compressed cake which is difficult to wash. Another factor in efficient washing of a press cake is its uniform resistance to the penetration of the wash liquor. A porous cake usually exhibits a more uniform resistance than a more compressed cake and is therefore more easily washed. Where unequal resistance is present, however, the wash liquor follows the path of least resistance, and large quantities of wash liquor may be used with only partial cleaning of the cake for the pressure tends to drop rapidly as soon as sparging is started. The wash liquor traverses the more porous paths, leaving the less porous regions unwashed.

It has now been discovered that by incorporating certain types of insoluble gelatinous substances in the wash liquor, extremely efficient spargings can be conducted with relatively low wash liquor requirements, even with highly compressed cakes which contain viscous solutions. Although it is not exactly clear to us why this favorable result is achieved, we believe that the following is a partial explanation of what happens within the press under these conditions.

When the sparge liquor, containing a suspension of the insoluble gelatinous substance enters the press, flow occurs preferentially through the zones of least resistance. As the sparge proceeds, deposition of the insoluble gelatinous substance causes these zones to become relatively more resistant, with the result that preferential flow, and deposition, occurs at other zones which have then become relatively less resistant. This process of continuous deposition at the relatively less resistant zones, which then makes such zones relatively more resistant, results in a differential series of continuous depositions, such that the entire press cake is finally thoroughly sparged. Whereas pressure drops very rapidly when one sparges with untreated wash liquor, when a suitable insoluble gelatinous substance is added to the wash liquor, pressure is maintained, or may even increase, during the entire course of the sparge.

We have tested a large number of gelatinous, and other types of insoluble substances for this application and have found that certain natural clays, especially those which are readily hydrated to slimy or viscous forms, are very suitable. The bentonite clays known as "sodium bentonites," found in the clay mineral known as montmorillonite, are very efficient and economical to use in this application. Non-swelling bentonites, however, known as "calcium bentonites," do not function for this purpose. Complex magnesium aluminum silicates, which swell to a gelatinous form, may also be used. In general, the only requirement for successful application in sparging, as herein disclosed, is that the substance be substantially inert, insoluble in the wash liquor and swell to a gelatinous or slimy form, which then permits the differential type of sparging described above.

In practicing this invention, several of the examples given below describe the efficient sparging in plate and frame presses of highly compressed cakes containing sugar syrups. When sparged with water, pressure dropped rapidly after sparging was started, and even after pumping excessive amounts of water through the presses it was found, on opening, that only the upper one-third of the cakes had been washed, the lower two-thirds still retaining the thick sugar syrup. When a small amount of a swelling type bentonite was added to the sparge water, however, pressure was maintained during the course of the sparge, and on examining the press contents it was found that they had been thoroughly sparged. Heretofore, the only known method for recovering syrup from such presses was by successive repulp operations, which were time consuming, relatively inefficient and costly.

The invention is illustrated but is not limited by the following examples.

EXAMPLE I

A laboratory plate and frame press of the following dimensions was used: 4¾ inch diameter; 3 frames each of ⅞ inch thickness; 2 plates and 2 end-plates; total surface area, 0.75 square foot; total volume, 0.20 gallon.

To 1500 ml. of malt syrup heated to 180 degrees F. was added 50 grams of diatomaceous earth ("Hyflo") and after thoroughly mixing the slurry was pumped through the press and recycled for 30 minutes to permit a uniform "precoat" to deposit on the cloths. Collection of filtered syrup was then started and a total of 7500 ml. of filtered syrup was collected in three hours; the total weight of the "Hyflo" used, including the "precoat," was 150 grams. Pressure had reached 80 pounds per square inch at the end of the filtration. Sparging was conducted by pumping a hot (180 degrees F.) 1% suspension of bentonite (Volclay KWK) through the press. At the end of the sparge, which required 30 minutes, the pressure had increased to 100 pounds per square inch. The efficiency of this sparging operation was 96.4% as shown in Table I.

Table I
SPARGING LABORATORY SYRUP PRESS WITH 1% BENTONITE

| Sparge Fraction Number | Weight, grams | Soluble Solids Content, Per Cent | Total Wt. Soluble Solids, grams | Recovery of Total Soluble Solids in Press, Per Cent | Cumulative Sparging Efficiency, Per Cent |
|---|---|---|---|---|---|
| 1 | 1,179 | 47.92 | 565.0 | 54.7 | 54.7 |
| 2 | 932 | 30.98 | 288.7 | 27.9 | 82.6 |
| 3 | 1,129 | 11.35 | 128.1 | 12.4 | 95.0 |
| 4 | 473 | 3.15 | 14.9 | 1.4 | 96.4 |
| Repulp of Press Contents | 1,059 | 3.48 | 36.9 | 3.6 | |

For comparison, the filtration was repeated and hot water (180 degrees F.) was then used for sparging, i. e., without adding the bentonite. In this case, the pressure had dropped to 20 pounds per square inch at the end of the 30 minute sparge and, as shown in Table II, the sparging efficiency was only 36.1%.

Table II
SPARGING LABORATORY SYRUP PRESS WITH WATER

| Sparge Fraction Number | Weight, grams | Soluble Solids Content, Per Cent | Total Wt. Soluble Solids, grams | Recovery of Total Soluble Solids in Press, Per Cent | Cumulative Sparging Efficiency, Per Cent |
|---|---|---|---|---|---|
| 1 | 1,130 | 25.14 | 284.1 | 27.3 | 27.3 |
| 2 | 987 | 4.92 | 48.6 | 4.7 | 32.0 |
| 3 | 1,358 | 2.72 | 36.9 | 3.6 | 35.6 |
| 4 | 203 | 2.73 | 5.5 | 0.5 | 36.1 |
| Repulp of Press Contents | 1,974 | 33.64 | 664.1 | 63.9 | |

EXAMPLE II

Malt syrup was filtered as described in Example I and sparging was conducted with a 1% suspension of a complex colloidal magnesium aluminum silicate ("Veegum"). The sparging efficiency was 95.7%, compared to 36.1% for the plain water sparge.

EXAMPLE III

A pilot plant recessed plate press of the following dimensions was employed: ½ inch recessed plates, 16 x 16 inch square; 16 plates plus 2 end plates; total surface area 60.3 square feet; total volume, 2.5 cubic feet.

To 1200 pounds of malt syrup was added 25 pounds of diatomaceous earth ("Hyflo") and, after heating to 170 degrees F., the slurry was pumped through the press. At the end of the filtration, the pressure had reached 60 pounds per square inch. Sparging was conducted with a hot (180 degrees F.) 1% bentonite suspension (Volclay KWK). At the end the sparge, the pressure had increased to 80 pounds per square inch. The results are summarized in Table III.

Table III
SPARGING PILOT PLANT SYRUP PRESS WITH 1% BENTONITE

| Sparge Fraction Number | Weight, lbs. | Soluble Solids Content, Per Cent | Total Wt. Soluble Solids, lbs. | Recovery of Total Soluble Solids in Press, Per Cent | Cumulative Sparging Efficiency, Per Cent |
|---|---|---|---|---|---|
| 1 | 259 | 55.6 | 144.1 | 62.6 | 62.6 |
| 2 | 196 | 30.9 | 60.6 | 26.3 | 88.9 |
| 3 | 257 | 9.6 | 24.7 | 10.7 | 99.6 |
| 4 | 16 | 2.1 | 0.3 | 0.1 | 99.7 |
| Repulp of Press Contents | 190 | 0.3 | 0.6 | 0.3 | |

EXAMPLE IV

Whereas the foregoing examples illustrate the application of this process to the recovery of viscous sugar syrups, this example shows its application to a thin liquor containing a valuable enzyme which had been formed in a microbiological process. In filtering the enzyme solution from the microbial debris from which the enzyme had been formed, relatively large quantities of diatomaceous earth were used to facilitate the filtration, and efficient sparging of the resulting press cake was highly desirable. As shown in this example, this was readily accomplished by means of incorporating 1% bentonite in the wash liquor.

A plate and frame press of the following dimensions was employed: ½ inch recessed plates, 26 x 26 square inches; 41 plates plus 2 end plates; total surface area, 387 square feet; total volume, 130 gallons.

To 800 gallons of fermentation liquor, which contained bacterial debris, was added 350 pounds of diatomaceous earth ("Hyflo") and, after thorough mixing, the slurry was pumped through the press. At the end of the filtration, the pressure had reached 100 pounds per square inch. Sparging was conducted with a 1% slurry of bentonite (Volclay KWK). At the end of the sparge, the pressure had remained constant at 100 pounds per square inch. Table IV summarizes the results, where it may be seen that a sparging efficiency of 95.8% was obtained.

*Table IV*

SPARGING FERMENTATION LIQUOR PRESS WITH 1% BENTONITE

| Sparge Fraction Number | Weight, lbs. | Enzyme Units per Gram (D. V. Units) | Total Enzyme Units×10⁻⁶ (D. V. Units) | Recovery of Total Enzyme Units in Press, Per Cent | Cumulative Sparging Efficiency, Per Cent |
|---|---|---|---|---|---|
| 1 | 424 | 305 | 58.7 | 32.6 | 32.6 |
| 2 | 423 | 277 | 53.2 | 29.5 | 62.1 |
| 3 | 421 | 210 | 40.1 | 22.2 | 84.3 |
| 4 | 418 | 109 | 20.7 | 11.5 | 95.8 |
| Repulp of Press Contents | 1,252 | 13 | 7.6 | 3.2 | |

For comparison, the filtration was repeated as described above with the same batch of fermentation liquor, but water alone, i. e., without adding the bentonite, was used for sparging; in this case the pressure dropped from 100 to 60 pounds per square inch at the end of the sparge and, as seen in Table V, the sparging efficiency, with an equal volume of wash liquor, was only 66.3%.

*Table V*

SPARGING FERMENTATION LIQUOR PRESS WITH WATER

| Sparge Fraction Number | Weight, lbs. | Enzyme Units per Gram (D. V. Units) | Total Enzyme Units×10⁻⁶ (D. V. Units) | Recovery of Total Enzyme Units in Press, Per Cent | Cumulative Sparging Efficiency, Per Cent |
|---|---|---|---|---|---|
| 1 | 424 | 296 | 57.0 | 28.6 | 28.6 |
| 2 | 419 | 158 | 30.0 | 15.0 | 43.6 |
| 3 | 419 | 125 | 23.7 | 11.9 | 55.5 |
| 4 | 418 | 114 | 21.6 | 10.8 | 66.3 |
| Repulp of Press Contents | 1,276 | 116 | 67.2 | 33.7 | |

It will be understood that the invention is susceptible to variations in the manner of its practical application and that those skilled in the art may make modifications without departing from the spirit and scope of the invention.

In general, only a small quantity or a small percentage based on the wash water of the swelling or gel-forming material is required. The quantity should be sufficient to decrease the pressure drop of the wash water through the filter cake but insufficient to cause the formation of a solid gel. In other words, the viscosity of the wash water is increased but it is still sufficiently fluid to be pumpable and the quantity of the gel-forming substance must not be such to entirely clog the pores of the filter cake.

The invention is hereby claimed as follows:

1. A process for the recovery of soluble solids from filter cakes which comprises incorporating with the wash liquor used for sparging said press cakes a substantially inert substance which is insoluble in the wash liquor and swells to a gelatinous form, the quantity of said inert substance being sufficient to decrease the pressure drop of the wash liquor through the filter cake but insufficient to cause the formation of a solid gel.

2. A process for the recovery of soluble solids from filter press cakes which comprises incorporating in the wash liquor used for sparging such press cakes a quantity of Montmorillonite which swells to a gelatinous form, said quantity being sufficient to decrease the pressure drop of the wash liquor through the filter cake but insufficient to cause the formation of a solid gel.

3. A process for the recovery of soluble solids from filter press cakes which comprises incorporating in the wash liquor used for sparging such press cakes a quantity of a magnesium aluminum silicate which swells to a gelatinous form, said quantity being sufficient to decrease the pressure drop of the wash liquor through the filter cake but insufficient to cause the formation of a solid gel.

4. A process for the recovery of soluble solids from filter press cakes which comprises incorporating in the wash liquor used for sparging such press cakes a quantity of bentonite, said quantity being sufficient to decrease the pressure drop of the wash liquor through the filter cake but insufficient to cause the formation of a solid gel.

5. A process for recovering soluble solids from viscous sugar syrup filter cakes which comprises sparging the filter cakes with a hot approximately 1% suspension of bentonite in water.

6. The method of recovering soluble solids from malt syrup filter cakes which comprises sparging the filter cakes with a hot approximately 1% suspension of bentonite in water.

7. The method of recovering soluble solids from filter cakes remaining after the filtration of enzyme solutions from microbial debris which comprises sparging such filter cakes with an approximately 1% slurry of bentonite in water.

SAMUEL A. MORELL.
JOHN SHOVERS.

REFERENCES CITED

The following references are of record in the file of this patent:

UNITED STATES PATENTS

| Number | Name | Date |
|---|---|---|
| 2,254,241 | Pittman et al. | Nov. 4, 1941 |
| 2,261,917 | Pittman et al. | Nov. 4, 1941 |
| 2,261,918 | Pittman et al. | Nov. 4, 1941 |
| 2,261,920 | Graff et al. | Nov. 4, 1941 |
| 2,261,922 | Pittman et al. | Nov. 4, 1941 |
| 2,261,923 | Pittman et al. | Nov. 4, 1941 |
| 2,261,924 | Pittman et al. | Nov. 4, 1941 |
| 2,307,326 | Lissauer | Jan. 5, 1943 |
| 2,450,683 | Pittman et al. | Oct. 5, 1948 |

OTHER REFERENCES

Int. Sug. Jour., March 1949, pp. 85 and 86.
Sugar, February 1950, pages 39–41.